(12) United States Patent
Wang et al.

(10) Patent No.: US 8,467,409 B2
(45) Date of Patent: Jun. 18, 2013

(54) METHOD, APPARATUS, AND SYSTEM FOR ADJUSTING MULTIMEDIA ENCODING RATE

(75) Inventors: Qi Wang, Shenzhen (CN); Ying Liu, Shenzhen (CN); Delei Yu, Shenzhen (CH); Lixia Xiong, Shenzhen (CN); Daoyan Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 276 days.

(21) Appl. No.: 12/979,947

(22) Filed: Dec. 28, 2010

(65) Prior Publication Data
US 2011/0090922 A1    Apr. 21, 2011

Related U.S. Application Data

(63) Continuation of application No. PCT/CN2009/072130, filed on Jun. 4, 2009.

(30) Foreign Application Priority Data

Jun. 30, 2008    (CN) .......................... 2008 1 0068194

(51) Int. Cl.
*H04J 3/16*        (2006.01)
*G06F 15/173*      (2006.01)

(52) U.S. Cl.
USPC ........................... 370/465; 370/468; 709/223

(58) Field of Classification Search
USPC ........................................................ 370/465
See application file for complete search history.

(56) References Cited

U.S. PATENT DOCUMENTS

| 5,898,696 | A  | * | 4/1999  | Proctor et al. ................ 370/468 |
| 7,151,749 | B2 |   | 12/2006 | Vega-Garcia et al. |
| 7,209,711 | B2 |   | 4/2007  | Terry et al. |
| 2004/0064309 | A1 | * | 4/2004  | Kosai ........................... 704/211 |
| 2004/0240390 | A1 |   | 12/2004 | Seckin |
| 2005/0089043 | A1 |   | 4/2005  | Seckin et al. |

(Continued)

FOREIGN PATENT DOCUMENTS

| CN | 1685734 A | 10/2005 |
| CN | 1926861 A | 3/2007 |

OTHER PUBLICATIONS

Matta, Johnny et al. "A Source and Channel Rate Adaptation Algorithm for AMR in VoIP Using the Emodel" pp. 92-99.

(Continued)

*Primary Examiner* — Noel Beharry
(74) *Attorney, Agent, or Firm* — Brinks Hofer Gilson & Lione

(57) ABSTRACT

A method, an apparatus, and a system for adjusting a multimedia encoding rate are disclosed. The method includes: obtaining an expected multimedia encoding rate by using the available network bandwidth corresponding to the transmission path of a multimedia service, the expected QoE of the multimedia service, and the current multimedia encoding rate as input parameters and according to a preset multimedia resource policy decision, where the expected multimedia encoding rate is used as a reference for adjusting the current multimedia encoding rate. With the present disclosure, under the current network performance, an optimal point for balancing the effects of the media encoding rate and the network performance on the QoE is found by adjusting the multimedia encoding rate, thus achieving optimal QoE. In this way, the adjustment process is simple and fast and the success rate is high, thus improving the QoE.

10 Claims, 5 Drawing Sheets

U.S. PATENT DOCUMENTS

| | | | |
|---|---|---|---|
| 2005/0100100 A1 | 5/2005 | Unger | |
| 2006/0140270 A1* | 6/2006 | Li et al. | 375/240.12 |
| 2007/0133441 A1 | 6/2007 | Kang et al. | |
| 2008/0155087 A1* | 6/2008 | Blouin et al. | 709/223 |
| 2008/0207182 A1* | 8/2008 | Maharajh et al. | 455/414.1 |

OTHER PUBLICATIONS

Lu, Xiaoxiang et al. "Understanding Video Quality and its use in Feedback Control".

International Search Report issued in corresponding PCT Application No. PCT/CN2009/072130; mailed Aug. 6, 2009.

Office Action issued in corresponding Chinese Patent Application No. 200810068194.3; mailed Jun. 6, 2102.

Cranley, Nicola "User Perceived Quality-Aware Adaptive Delivery of MPEG-4 Content" DRAA (China) Consortium State Intellectual Property Office of the Peoples Republic of China:42-49.

Written Opinion of the International Searching Authority issued in corresponding PCT Patent Application No. PCT/CN2009/072130, mailed Aug. 6, 2009.

Extended European Search Report issued in corresponding European Patent Application No. 09771938.9, mailed Jun. 28, 2011.

Telecommunication Standardization Sector of ITU, "Measurement-Based Methods for Improving the Robustness of IPTV Performance", Series G: Transmission Systems and Media, Digital Systems and Networks, Multimedia Quality of Service and Performance—Generic and User Related Aspects. G.1082, Apr. 2009.

Cranley et al., "User-Perceived Quality-Aware Adaptive Delivery of MPEG-4 Content", NOSSDAV '03, Monterrey, California. Jun. 1-3, 2003.

Lopez et al., "An Owl Based Architecture for Self-Optimizing Multimedia Over IP Services", http://jungla.dit.upm.es/~jlopez/publicaciones/mace06.pdf, Oct. 26, 2006.

Muntean, "A New Adaptive Multimedia Streaming System for All-IP Multi-Service Networks", IEEE Transactions On Broadcasting, vol. 50, No. 1, Mar. 2004.

* cited by examiner

METHOD, APPARATUS, AND SYSTEM FOR ADJUSTING MULTIMEDIA ENCODING RATE

CROSS-REFERENCE TO RELATED APPLICATIONS

This application is continuation of International Application No. PCT/CN2009/072130, filed on Jun. 4, 2009, which claims priority to Chinese Patent Application No. 200810068194.3, filed on Jun. 30, 2008, both of which are hereby incorporated herein by reference in their entireties.

FIELD OF THE DISCLOSURE

The present disclosure relates to a network technology in the communications field, and in particular, to a method, an apparatus, and a system for adjusting a multimedia encoding rate.

BACKGROUND

With the development of multimedia communications technologies, various multimedia services are provided. Therefore, the multimedia service quality plays an important role in multimedia processing and multimedia communications fields.

In multimedia services, for example, Internet Protocol Television (IPTV) and radio services, because the traditional quality of service (QoS) parameter of the network layer cannot reflect the quality of experience (QoE) of a user visually, the QoE value is used to measure the user experience on the video quality.

In the prior art, in IP multimedia services, the user's QoE is improved according to the QoE value that the user feeds back to the media server. That is, the media server compares the QoE value within a time window with a predetermined threshold; if the video quality is declining and exceeds the threshold, the media server reduces the encoding rate to relieve the congestion. In this way, the QoE of the video is improved, and the user's QoE is improved.

During the implementation of the present disclosure, the inventor discovers at least the following problems in the prior art:

The encoding rate is increased or reduced only according to the QoE fed back by the user. This may not improve the QoE. If the encoding rate is reduced only according to the QoE, some information is lost, and the network performance may not meet the requirement. Thus, the obtained QoE value may not meet the user's expectation and a proper value can be found only by adjusting the rate for multiple times.

SUMMARY

Embodiments of the present disclosure provide a method, an apparatus, and a system for adjusting a multimedia encoding rate, so that an optimal point for balancing the effects of the media encoding rate and the network performance on the QoE is found by adjusting the multimedia encoding rate on the current network, thus achieving optimal QoE.

To achieve the foregoing objective, embodiments of the disclosure provide the following technical solution:

A method for adjusting a multimedia encoding rate includes: obtaining an available network bandwidth corresponding to a transmission path of a multimedia service; obtaining expected QoE of the multimedia service and a current multimedia encoding rate; and obtaining an expected multimedia encoding rate by using the available network bandwidth, the expected QoE of the multimedia service, and the current multimedia encoding rate as input parameters and according to a preset multimedia resource decision policy, where the expected multimedia encoding rate is used as a reference for adjusting the current multimedia encoding rate.

A system for adjusting a multimedia encoding rate includes a multimedia resource control server and a network resource control server.

The multimedia resource control server is configured to: interact with the network resource control server to obtain an available network bandwidth corresponding to a transmission path of a multimedia service; and obtain an expected multimedia encoding rate according to a preset multimedia resource decision policy and by using the available network bandwidth corresponding to the transmission path of the multimedia service, expected QoE of the multimedia service, and a current multimedia encoding rate as input parameters, where the expected multimedia encoding rate is used as a reference for adjusting the current multimedia encoding rate.

The network resource control server is configured to: determine the available network bandwidth corresponding to the transmission path of the multimedia service according to a request sent from the multimedia resource control server, and return the available network bandwidth to the multimedia resource control server.

A multimedia resource control server includes an obtaining unit and a multimedia resource deciding unit.

The obtaining unit is configured to: obtain an available network bandwidth corresponding to a transmission path of a multimedia service, expected QoE, and a current multimedia encoding rate, and send the obtained information to the multimedia resource deciding unit.

The multimedia resource deciding unit is configured to: receive the information obtained by the obtaining unit, and obtain an expected multimedia encoding rate according to a multimedia resource decision policy and by using the available network bandwidth corresponding to the transmission path of the multimedia service, the expected QoE, and the current multimedia encoding rate as input parameters, where the expected multimedia encoding rate is used as a reference for adjusting the current multimedia encoding rate.

DETAILED DESCRIPTION OF THE EMBODIMENTS

To make the technical solutions of the present disclosure more comprehensible, the present disclosure is described in detail with reference to the accompanying drawings and embodiments.

A method for adjusting the multimedia encoding rate in an embodiment includes: obtaining an available network bandwidth corresponding to a transmission path of a multimedia service; obtaining the expected QoE of the multimedia service and the current multimedia encoding rate; and obtaining an expected multimedia encoding rate by using the available network bandwidth, the expected QoE of the multimedia service, and the current multimedia encoding rate as input parameters and according to a preset multimedia resource decision policy, where the expected multimedia encoding rate is used as a reference for adjusting the current multimedia encoding rate.

In the following embodiments, the available bandwidth of the current network is the available network bandwidth corresponding to the transmission path of the multimedia service.

Figure 1:
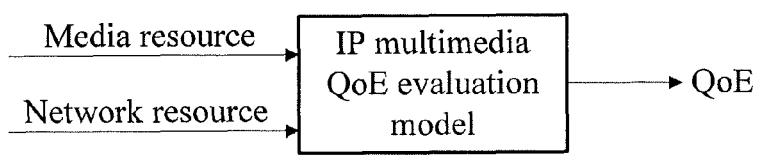
FIG. 1 is a schematic diagram illustrating an IP multimedia evaluation model according to an embodiment of the present disclosure.

FIG. 1 shows a QoE evaluation model of an IP multimedia service. The QoE evaluation model uses a multimedia resource and a network resource as the input parameters, and uses the QoE as the output value. In this way, the QoE evaluation model among the multimedia resource, network resource, and the IP multimedia service is established. Subjective evaluation is performed on the video quality, and each parameter value of the QoE evaluation model is obtained by using the regression algorithm.

Further, the two input parameters in the QoE evaluation model, that is, the multimedia resource and network resource, are main factors that reduce the video quality in the video transmission system. Thus, users can enjoy satisfactory QoE only under the joint effect of the multimedia resource and the network resource.

The multimedia resource refers to various indexes involved in the process of encoding the IP multimedia service and radio service. These indexes determine the degree of damage in the service encoding process, thus affecting the user's QoE. Specifically, these indexes include the encoding quantization granularity and media encoding rate.

The network resource refers to the network QoS performance of services received by the users, namely, packet loss related parameters including the bandwidth resource, packet loss ratio, and packet loss burst event or delay jitter, which are monitored on a real-time basis. The network resource determines the network performance and affects the degree of damage in the service transmission process, thus affecting the user's QoE. Thus, the QoE evaluation model uses the multimedia resource and network resource as the input parameters, and uses the QoE as the output value.

Figure 2:
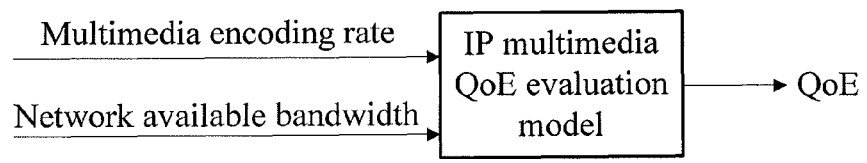
FIG. 2 is a schematic diagram illustrating another IP multimedia evaluation model according to an embodiment of the present disclosure.

FIG. 2 illustrates another IP multimedia evaluation model.

In FIG. 2, a QoE evaluation model is established among the media encoding rate, the available network bandwidth, and the IP multimedia service by using the multimedia encoding rate and the available network bandwidth as the input parameters and using the QoE as the output value. The available network bandwidth is the current available bandwidth.

The multimedia encoding rate is the main parameter reflecting the multimedia resource. The available network bandwidth is the main parameter reflecting the network resource.

Among the indexes of the multimedia resource, the multimedia encoding rate is one of the main factors affecting the user's QoE. The multimedia encoding rate is the bit rate output by the encoder. The higher the media encoding rate is, the clearer the picture is, and vice versa. Experiments show that the media encoding rate is one of the main factors that affect the user's QoE if the network performance remains unchanged and that the user's QoE may be improved by increasing the media encoding rate. However, a higher media encoding rate requires a larger bandwidth and affects the network performance. Thus, it is not enough to increase the media encoding rate merely.

Of the indexes of the network resource, the available network bandwidth is the key factor that affects the network performance parameter. For example, if the bandwidth is inadequate in the transmission process, network congestion may occur, which causes the loss of packets and discarding of video packets. As a result, the video quality of the user will be definitely affected. If the discarded packets include important information, the user may be greatly affected. In addition, if the available network bandwidth is inadequate, a delay may occur. Thus, the available network bandwidth is the key factor that affects the network performance parameter.

Therefore, a QoE evaluation model of the IP multimedia service is established according to the main parameter of the multimedia resource (that is, the media encoding rate) and the main parameter of the network resource (that is, the available network bandwidth), as shown in FIG. 2.

Figure 3:
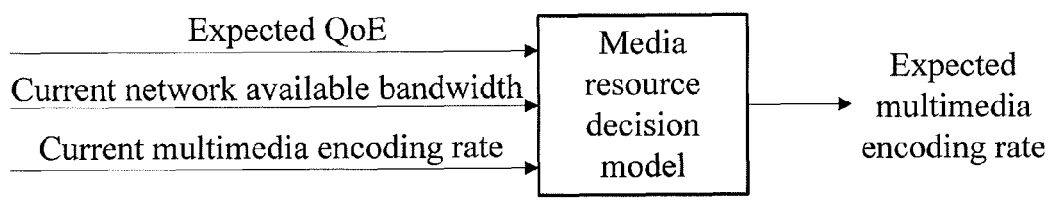
FIG. 3 is a schematic diagram illustrating a multimedia resource decision model according to an embodiment of the present disclosure.

The relation of the multimedia resource decision model is obtained by using the QoE evaluation model of the IP multimedia service and the relation QoE=f (media encoding rate, available network bandwidth). The relation among the QoE, the media encoding rate, and the available network bandwidth is obtained through constant training with the subjective measurement value. That is, the multimedia resource decision model shown in FIG. 3 is obtained. The expected QoE of the IP multimedia service, the available network bandwidth, and the current media encoding rate are used as the input parameters of the multimedia resource decision model, and an expected media encoding rate is output according to the multimedia resource decision model.

The multimedia resource decision model shown in FIG. 3 reflects the following process: A most proper media encoding rate (that is, the expected media encoding rate) is calculated by using the relation of the media resource decision model and according to the user's expected QoE, the current available network bandwidth of the network path that the media stream passes through, and the current media encoding rate; the media encoding rate is adjusted to the expected media encoding rate. In this way, under the current network performance, the expected media encoding rate may be selected to meet the user's expected QoE.

The multimedia resource decision model is one of the multimedia resource decision polices.

In this embodiment, a multimedia resource decision model is established among the user's expected QoE, the current available network bandwidth of the network path that the multimedia stream passes through, the current media encoding rate, and the expected media encoding rate. Thus the user's adjustment process is simplified, and an optimal point for balancing the effects of the media encoding rate and the network performance on the QoE is found, so that the user's expected QoE can be achieved under the current network performance.

Figure 4:
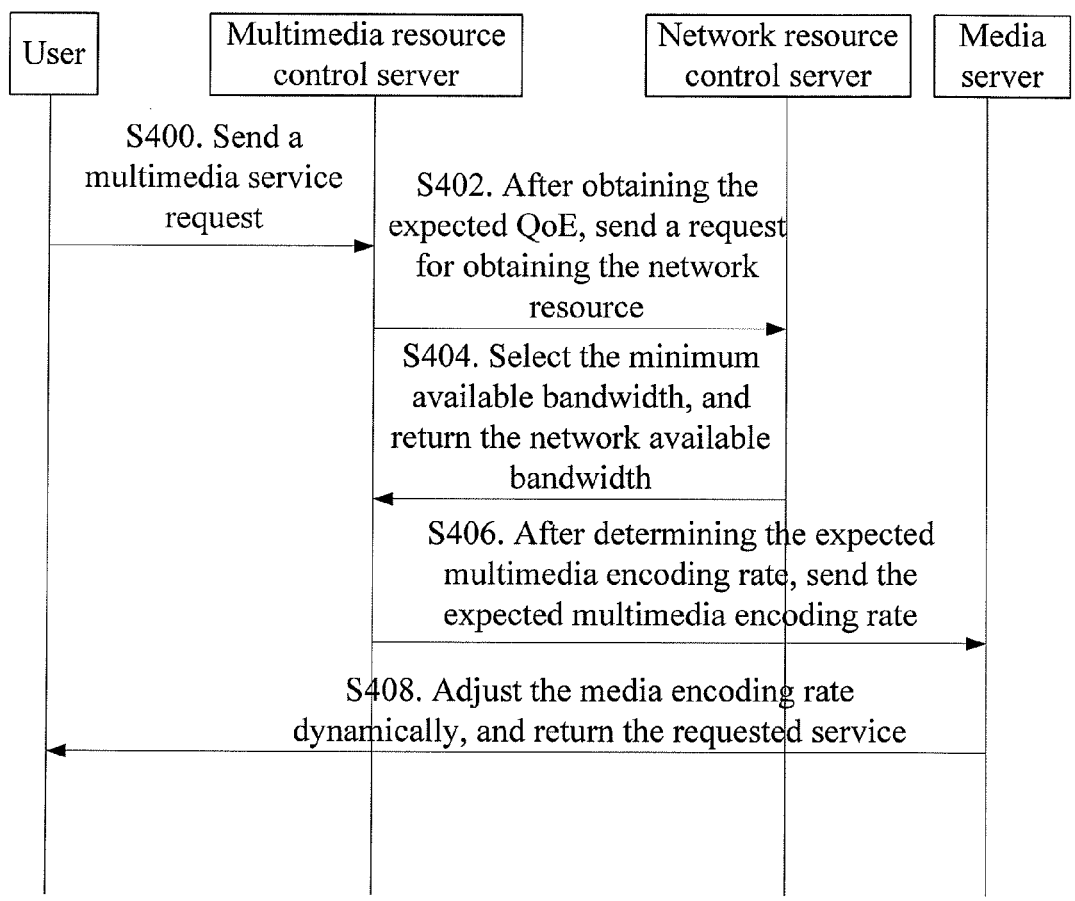
FIG. 4 is a flowchart of a method for adjusting a multimedia encoding rate according to an embodiment of the present disclosure.

FIG. 4 is a flowchart of a method for adjusting the multimedia encoding rate according to an embodiment of the present disclosure.

Step S400: The user sends a multimedia service request to the multimedia resource control server, and the multimedia resource control server determines the expected QoE for the service requested by the user.

When the user sends a multimedia service request to the multimedia resource control server, two method are available for determining the expected QoE: querying for and obtaining the expected QoE of the multimedia service according to the user's multimedia service request; or obtaining the expected QoE according to a multimedia service request or a multimedia service QoE improvement request that carries the expected QoE of the multimedia service. The expected QoE is the parameter value that the user expects to obtain and which reflects the optimal video quality of the service. When the querying method is used to obtain the expected QoE of the multimedia service, if the expected QoE of the multimedia service is not found, the user is requested to send the expected QoE of the multimedia service.

Step S402: The multimedia resource control server sends a request for obtaining the network resource to the network resource control server according to the service request sent from the user.

Specifically, the multimedia resource control server sends a request for obtaining the network resource, where the request includes quintuple information of the service, that is, the IP address of the media server, IP address of the terminal user, source port number of the media server providing the multimedia service, port number and protocol type of the terminal user receiving the multimedia service, requesting to obtain the network resource that the service requested by the user passes through. The network resource is the current available bandwidth information of all physical links of the transmission path that the multimedia service requested by the user passes through.

Step S404: The network resource control server receives the request, selects the minimum available bandwidth, and returns it to the multimedia resource control server.

Firstly, the network resource control server calculates the transmission path that the multimedia service requested by the user may pass through, and finds the current available bandwidth information corresponding to each physical link of the transmission path stored on the network resource control server according to the transmission path of the multimedia service; or the network resource control server requests the network resource monitoring server to query for the current available network bandwidth information corresponding to each physical link of the transmission path that the multimedia service may pass through. Secondly, the network resource control server selects the minimum value of the current available bandwidth information corresponding to all the physical links as the current available bandwidth information corresponding to the transmission path of the multimedia service, and returns the value to the multimedia resource control server; or the network resource control server sends the current available network bandwidth information to the multimedia resource control server, and the multimedia resource control server selects the minimum value of the current available bandwidth information corresponding to all the physical links as the current available bandwidth information corresponding to the transmission path of the multimedia service.

Step S406: The multimedia resource control server obtains an expected media encoding rate according to the multimedia resource decision model, and sends the expected media encoding rate to the media server.

The expected media encoding rate is obtained according to the multimedia resource decision model. The expected media encoding rate reflects the optimal point for balancing the effects of the media encoding rate and the network performance on the QoE. In this way, the user can achieve the expected QoE under the current network performance.

The expected QoE requested by the user, the available network bandwidth, and the current media encoding rate are used as the input parameters of the multimedia resource decision model. Because it is the first time for the user to request the service, the third input parameter of the multimedia resource decision model, that is, the current media encoding rate, is 0. The expected media encoding rate is output according to the multimedia resource decision model shown in FIG. 3.

The multimedia resource decision model may comprise multiple function relations, that is, the relation among the expected QoE, available network bandwidth, current media encoding rate, and expected multimedia encoding rate: Expected multimedia encoding rate=Function (current media encoding rate, current available network bandwidth, expected QoE). For example, the formula is as follows:

$$\text{Expected multimedia encoding rate} = \\ p_0 Currentavailablebandwidth + p_1 \sqrt{Currentavailablebandwidth} + \\ p_2 \text{Current multimedia encoding rate} + \\ p_3 \sqrt{\text{Current multimedia encoding rate}} + p_4 \text{Expected } QoE$$

In this formula, P0 P1 P2 P3 P4 refer to coefficients and represent the weight of each factor, which may be adjusted. The expected media encoding rate is calculated by using the preceding formula according to the user's expected QoE, current available network bandwidth, and current media encoding rate. This formula gives only one of feasible solutions. This formula features simple relations among the parameters and ease of calculation.

The expected media encoding rate calculated by the multimedia resource decision model is sent to the media server for encoding, and the media encoding rate is saved.

The media server may be other devices on the network besides the media server in the multimedia system. Other devices on the network may be network devices that are able to adjust and regenerate multimedia resources, for example, a digital subscriber line access multiplexer (DSLAM), a broadband remote access server (BRAS), and a router.

Step S408: The media server outputs a media stream to the user according to the received expected media encoding rate.

The media server may be other devices on the network besides the media server in the multimedia system. Other devices on the network may be network devices that are able to adjust and regenerate multimedia resources, for example, a DSLAM, a BRAS, and a router.

In this embodiment, an expected media encoding rate is obtained by using the expected QoE and the available network bandwidth as the input parameters of the multimedia resource decision model. In this way, an optimal point for balancing the effects of the media encoding rate and the network performance on the QoE is found, and the repeated adjustment process is simplified, thus achieving the user's expected QoE under the current network performance.

FIG. 4 illustrates an application scenario of the method for adjusting the media encoding rate dynamically when the user requests the service for the first time. The following describes an application scenario of the method for adjusting the media encoding rate dynamically in the process of receiving IP multimedia services after the user requests the service for the first time, as shown in FIG. 5.

Figure 5:
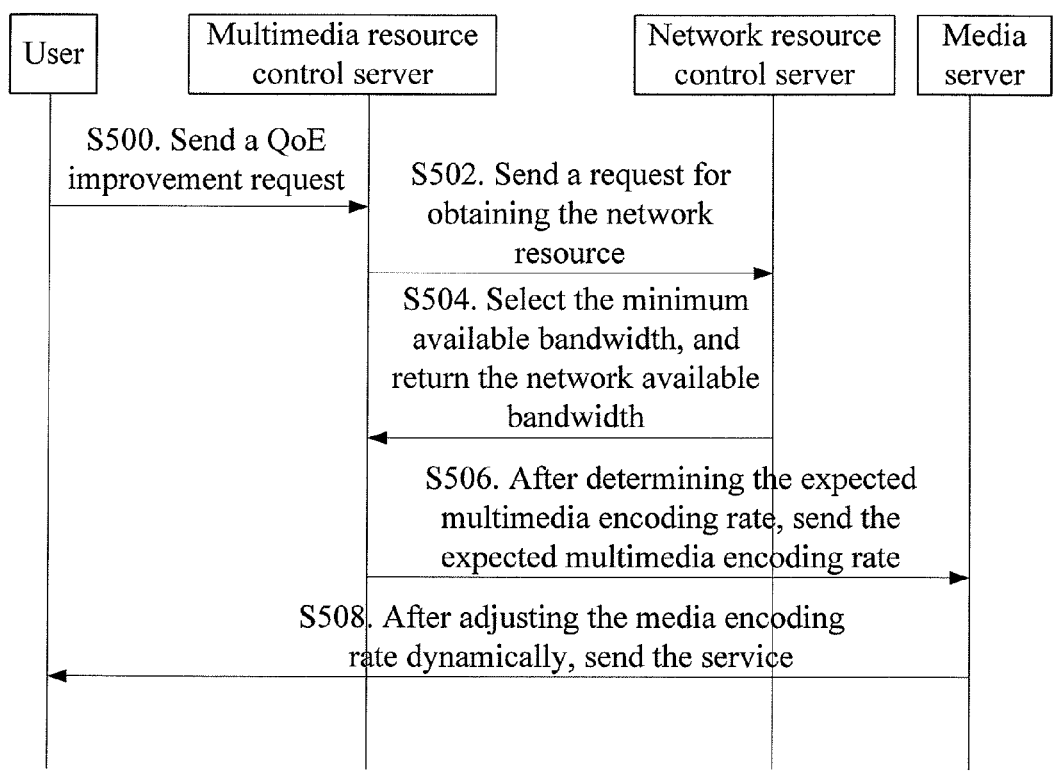
FIG. 5 is a flowchart of a method for adjusting a multimedia encoding rate according to an embodiment of the present disclosure.

FIG. 5 is a flowchart of a method for adjusting the media encoding rate dynamically according to an embodiment of the present disclosure.

Step S500: When the current QoE fails to meet the requirement, the user sends a multimedia service QoE improvement request to the multimedia resource control server.

Specifically, the current QoE fails to meet the requirement in the following two scenarios: 1. The user monitors the QoE of the received IP multimedia service on a real-time basis, and compares this QoE with the expected QoE of the service stored by the user. The user may store the expected QoE of the multimedia service and report policies. For example, when the monitored QoE is lower than the expected QoE, or the expected QoE is declining, the user sends a multimedia service QoE improvement request to the multimedia resource control server; 2. The multimedia resource control server monitors the QoE on a real-time basis, and compares the current QoE of the service with the expected QoE of the multimedia service stored on the multimedia resource control server. For example, when the monitored QoE is lower than the expected QoE or the expected QoE is declining, the process proceeds to step 502.

Two methods are available for obtaining the expected QoE of the service: querying for and obtaining the expected QoE of the multimedia service according to the multimedia service QoE improvement request from the user; or obtaining the expected QoE according to a multimedia service request or a multimedia service QoE improvement request that carries the expected QoE of the multimedia service. The expected QoE is the parameter value that the user expects to obtain and that reflects the optimal video quality of the service. When the querying method is used to obtain the expected QoE of the multimedia service, if the expected QoE of the multimedia service is not found, the user is requested to send the expected QoE of the multimedia service.

Step S502: The multimedia resource control server sends a request for obtaining the network resource to the network resource control server according to the request from the user, requesting to obtain the network resource information of the transmission path that the service requested by the user passes through.

The multimedia resource control server sends a request for obtaining the network resource, where the request includes quintuple information of the service, that is, the IP address of the media server, IP address of the terminal user, source port number of the media server providing the multimedia service, port number and protocol type of the terminal user receiving the multimedia service, requesting to obtain the network resource information that the service requested by the user passes through. The network resource is the current available bandwidth information of all physical links of the transmission path that the multimedia service requested by the user passes through.

Step S504: The network resource control server receives the request, selects the minimum available bandwidth, and returns it to the multimedia resource control server.

Firstly, the network resource control server calculates the transmission path that the multimedia service requested by the user may pass through, and finds the current available bandwidth information corresponding to each physical link of the transmission path stored on the network resource control server according to the transmission path of the multimedia service; or the network resource control server requests the network resource monitoring server to query for the current available network bandwidth information corresponding to each physical link of the transmission path that the multimedia service may pass through. Secondly, the network resource control server selects the minimum value of the current available bandwidth information corresponding to all the physical links as the current available bandwidth information corresponding to the transmission path of the multimedia service, and returns the value to the multimedia resource control server; or the network resource control server sends the current available network bandwidth information to the multimedia resource control server, and the multimedia resource control server selects the minimum value of the current available bandwidth information corresponding to all the physical links as the current available bandwidth information corresponding to the transmission path of the multimedia service.

Step S506: The multimedia resource control server obtains an expected media encoding rate according to the multimedia resource decision model, and sends the expected media encoding rate to the media server.

The expected media encoding rate is obtained according to the multimedia resource decision model. It reflects the optimal point for balancing the effects of the media encoding rate and the network performance on the QoE. In this way, the user can achieve the expected QoE under the current network performance.

The expected QoE of the user, the available bandwidth of the network that the user passes through and the current media encoding rate are used as the input parameters of the multimedia resource decision model. The expected media encoding rate is output according to the multimedia resource decision model. The current media encoding rate is stored on the multimedia resource control server and retrieved by the multimedia resource control server.

The multimedia resource decision model may comprise multiple function relations, that is, the relation among the expected QoE, available network bandwidth, current media encoding rate, and expected multimedia encoding rate: Expected multimedia encoding rate=Function (current media encoding rate, current available network bandwidth, QoE). For example, the formula is as follows:

$$\text{Expected multimedia encoding rate} = \\ p_0 Currentavailablebandwidth + p_1 \sqrt{Currentavailablebandwidth} + \\ p_2 \text{Current multimedia encoding rate} + \\ p_3 \sqrt{\text{Current multimedia encoding rate}} + p_4 \text{Expected } QoE$$

In this formula, P0 P1 P2 P3 P4 refer to coefficients and represent the weight of each factor, which may be adjusted. The expected media encoding rate is calculated by using the preceding formula according to the user's expected QoE, current available network bandwidth, and current media encoding rate. This formula gives only one of feasible solutions. This formula features simple relations among the parameters and ease of calculation.

The expected media encoding rate calculated by the multimedia resource decision model is sent to the media server for encoding, and the media encoding rate is saved.

The media server may be other devices on the network besides the media server in the multimedia system. Other devices on the network may be network devices that are able to adjust and regenerate the multimedia resource, for example, a DSLAM, a BRAS, and a router.

Step S508: The media server outputs the multimedia service according to the expected media encoding rate.

This step may further include the following: The media server dynamically adjusts the expected media encoding rate. Multiple methods for dynamically adjusting the expected media encoding rate are available. If the media server is located in the multimedia system, the media server selects a proper encoding parameter according to the expected media encoding rate, and adjusts and outputs the expected encoding rate according to the new encoding parameter. If the media server is other devices on the network that do not have the re-encoding capability but can identity the frame type, the media server may adjust the multimedia encoding rate according to the frame type. One of the methods is as follows: reducing the encoding rate, discarding the unimportant data frames, for example, B frames, and guaranteeing the transmission of important frames, for example, I frames and P frames; increasing the encoding rate, restoring the important data frames firstly, and then restoring the unimportant frames.

All or part of the steps of the method according to the embodiments of the present disclosure may be implemented by a program instructing relevant hardware including at least one processor. The program may be stored in a computer readable storage medium. When the program runs, the steps of the method according to the embodiments of the present disclosure are performed. The storage medium may be a read only memory (ROM), a random access memory (RAM), a magnetic disk, or a compact disk read-only memory (CD-ROM).

The following describes the system and apparatus for adjusting the multimedia encoding rate.

Figure 6:
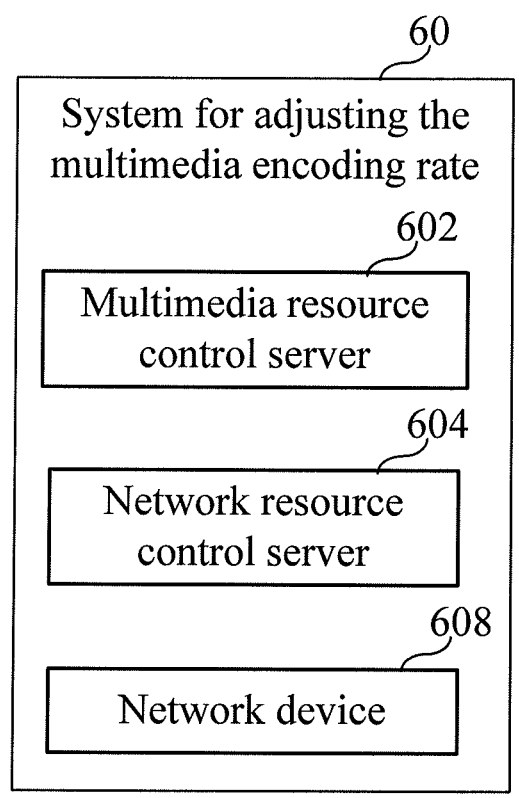
FIG. 6 illustrates the structure of a system for adjusting a multimedia encoding rate according to an embodiment of the present disclosure.

FIG. 6 illustrates a structure of a system for adjusting the multimedia encoding rate according to an embodiment of the present disclosure.

A system 60 for adjusting the multimedia encoding rate includes a multimedia resource control server 602 and a network resource control server 604.

The multimedia resource control server 602 is configured to: interact with the network resource control server to obtain the available network bandwidth corresponding to the transmission path of a multimedia service; obtain an expected multimedia encoding rate according to a preset multimedia resource policy and by using the available network bandwidth corresponding to the transmission path of the multimedia service, expected QoE of the multimedia service, and current multimedia encoding rate as input parameters, where the expected multimedia encoding rate is used as a reference for adjusting the current multimedia encoding rate.

The network resource control server 604 is configured to: determine the available network bandwidth corresponding to the transmission path of the multimedia service according to a request sent from the multimedia resource control server 602, and return the available network bandwidth to the multimedia resource control server 602. The available network bandwidth corresponding to the transmission path of the multimedia service is the minimum value of available bandwidths of multiple physical links on the transmission path of the multimedia service.

The system for adjusting the encoding rate in the preceding embodiment further includes a network device 606.

The network device 606 is configured to: receive the expected media encoding rate sent from the multimedia resource control server 602, and output a multimedia service corresponding to the expected multimedia encoding rate. The network device is the multimedia server or other network devices that are able to adjust and regenerate the multimedia resource.

Figure 7:
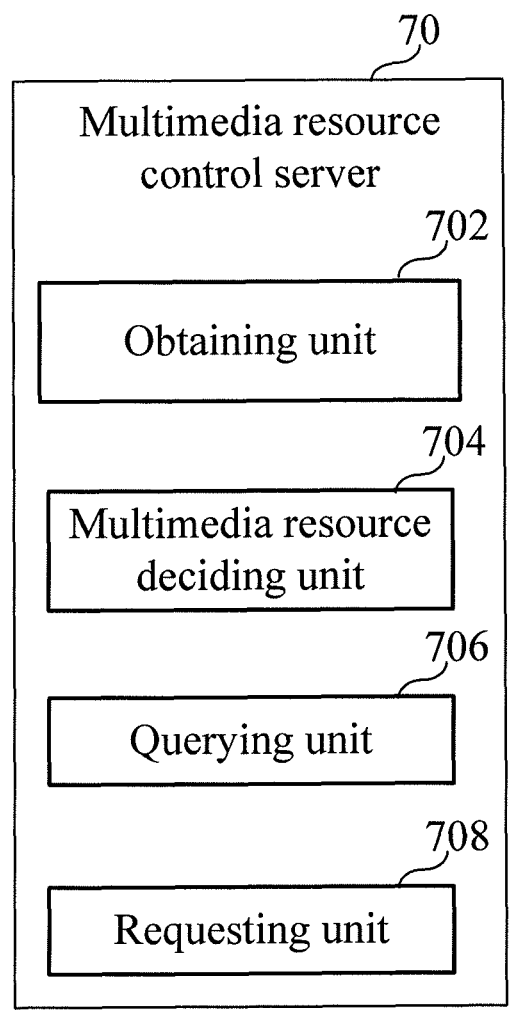
FIG. 7 illustrates the structure of a multimedia resource control server according to an embodiment of the present disclosure.

FIG. 7 illustrates the structure of a multimedia resource control server according to an embodiment of the present disclosure.

A multimedia resource control server includes an obtaining unit 702 and a multimedia resource deciding unit 704.

The obtaining unit 702 is configured to: obtain the available network bandwidth corresponding to the transmission path of a multimedia service, expected QoE, and a current multimedia encoding rate, and send the obtained information to the multimedia resource deciding unit.

The multimedia resource deciding unit 704 is configured to: receive the information obtained by the obtaining unit, and obtain an expected multimedia encoding rate according to the multimedia resource decision policy and by using the available network bandwidth corresponding to the transmission path of the multimedia service, the expected QoE, and the current multimedia encoding rate as input parameters, where the expected multimedia encoding rate is used as a reference for adjusting the current multimedia encoding rate.

The multimedia resource control server further includes: a querying unit 706, configured to query for and obtain the expected QoE of the multimedia service according to the multimedia service request or the multimedia service QoE improvement request.

The multimedia resource control server may further include: a requesting unit 708, configured to request the user to send expected QoE of the multimedia service when the querying unit 706 fails to find the expected QoE of the multimedia service.

In embodiments of the present disclosure, under the current network performance, an optimal point for balancing the effects of the media encoding rate and the network performance on the QoE is found by adjusting the multimedia encoding rate, thus achieving optimal QoE. In this way, the adjustment process is simple and fast and the success rate is high, thus improving the QoE.

In conclusion, the above are merely some exemplary embodiments of the present disclosure. However, the scope of the present disclosure is not limited thereto. Changes or replacements readily apparent to persons skilled in the prior art within the technical scope of the present disclosure should fall within the scope of the present disclosure. Therefore, the scope of the present disclosure is subject to the appended claims.

What is claimed is:

1. A method for adjusting a multimedia encoding rate, comprising:
    obtaining an available network bandwidth corresponding to a transmission path of a multimedia service;
    obtaining expected quality of experience (QoE) of the multimedia service and a current multimedia encoding rate of the multimedia service;
    obtaining a multimedia resource decision model, wherein the multimedia resource decision model is determined from by a combination of a QoE evaluation model and a QoE relation from among the QoE, the current media encoding rate, and the available network bandwidth, and wherein the QoE relation is obtained through constant training on the multimedia resource decision model according to subjective measurement values; and
    obtaining an expected multimedia encoding rate which is determined from the obtained multimedia resource decision model, wherein the multimedia resource decision model utilizes the available network bandwidth, the expected QoE of the multimedia service, and the current multimedia encoding rate of the multimedia service as input parameters, and wherein the expected multimedia encoding rate is used as a reference for adjusting the current multimedia encoding rate by a multimedia resource control server.

2. The method of claim 1, wherein:
the available network bandwidth corresponding to the transmission path of the multimedia service is a minimum value of available bandwidths of multiple physical links on the transmission path of the multimedia service.

3. The method of claim 1, wherein obtaining the expected QoE of the multimedia service comprises one of the following:
querying for and obtaining the expected QoE of the multimedia service according to a multimedia service request or a multimedia service QoE improvement request sent from a user, and
obtaining the expected QoE according to a multimedia service request or a multimedia service QoE improvement request that carries the expected QoE of the multimedia service sent from the user.

4. The method of claim 3, further comprising:
when querying for and obtaining the expected QoE of the multimedia service according to the multimedia service request or multimedia service QoE improvement request sent from the user, requesting the user to send the expected QoE of the multimedia service if failing to find the expected QoE of the multimedia service.

5. The method of claim 1, wherein the preset multimedia resource decision model forms a QoE relation among the available network bandwidth corresponding to the transmission path of the multimedia service, the expected QoE, the current multimedia encoding rate, and the expected multimedia encoding rate.

6. A system for adjusting a multimedia encoding rate, comprising a multimedia resource control server and a network resource control server, wherein:
the multimedia resource control server is configured to:
interact with the network resource control server to obtain an available network bandwidth corresponding to a transmission path of a multimedia service;
obtain a multimedia resource decision model, wherein the multimedia resource decision model is determined from by a combination of a QoE evaluation model and a QoE relation from among the QoE, the current media encoding rate, and the available network bandwidth, and wherein the QoE relation is obtained through constant training on the multimedia resource decision model according to subjective measurement values;
obtain an expected multimedia encoding rate which is determined from the obtained multimedia resource decision model, wherein the multimedia resource decision model utilizes the available network bandwidth an expected quality of experience (QoE) of the multimedia service, and a current multimedia encoding rate of the multimedia service as input parameters, and wherein the expected multimedia encoding rate is used as a reference for adjusting the current multimedia encoding rate; and
the network resource control server is configured to: determine the available network bandwidth according to a request sent from the multimedia resource control server, and return the available network bandwidth to the multimedia resource control server.

7. The system of claim 6, wherein the available network bandwidth corresponding to the transmission path of the multimedia service is a minimum value of available bandwidths of multiple physical links on the transmission path of the multimedia service.

8. The system of claim 6, further comprising:
a network device, configured to receive the expected media encoding rate sent from the multimedia resource control server, and output a multimedia service corresponding to the expected multimedia encoding rate.

9. The system of claim 8, wherein the network device is a multimedia server configured to adjust and regenerate multimedia resources.

10. The system of claim 8, wherein the network device is a network device configured to adjust and regenerate multimedia resources.

* * * * *